US012805536B2

(12) United States Patent
Sheerin et al.

(10) Patent No.: US 12,805,536 B2
(45) Date of Patent: Nov. 24, 2026

(54) WATER DETECTION SYSTEM AND METHOD FOR AN INDOOR SMOKER

(71) Applicant: Haier US Appliance Solutions, Inc., Wilmington, DE (US)

(72) Inventors: Luke Sheerin, Louisville, KY (US); Steven Fox, Daytona Beach, FL (US); George Carpenter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 804 days.

(21) Appl. No.: 18/323,753

(22) Filed: May 25, 2023

(65) Prior Publication Data

US 2024/0389609 A1 Nov. 28, 2024

(51) Int. Cl.

*A23B 4/052* (2006.01)
*A47J 37/06* (2006.01)

(52) U.S. Cl.

CPC ............... *A23B 4/052* (2013.01); *A47J 37/06* (2013.01)

(58) Field of Classification Search

CPC ................................. A47J 37/06; A23B 4/052
USPC ........................................................... 99/352
See application file for complete search history.

(56) References Cited

U.S. PATENT DOCUMENTS 3,806,102 A * 4/1974 Valenta ................. A61M 16/16 261/DIG. 65
4,241,719 A * 12/1980 Vickery .............. F28D 21/0008 126/290
4,538,509 A * 9/1985 Ojima ...................... A21B 1/40 366/144
5,964,143 A * 10/1999 Driscoll ............. A47J 27/21191 99/313
6,037,570 A * 3/2000 Noles .................. A47J 27/2105 392/447

(Continued)

FOREIGN PATENT DOCUMENTS

WO WO2022051802 A1 3/2022

OTHER PUBLICATIONS

Martin Schmitz et al., Oh, Snap! A Fabrication Pipeline to Magnetically Connect Conventional and 3D-Printed Electronics, CHI Conference on Human Factors in Computing Systems (CHI '21), May 8-13, 2021, Yokohama, Japan, ACM, New York, NY, USA, https://doi.org/10.1145/3411764.3445641, accessed May 25, 2023, 11 pages.

(Continued)

*Primary Examiner* — Jimmy Chou
(74) *Attorney, Agent, or Firm* — Dority & Manning, P.A.

(57) ABSTRACT

An indoor smoker includes a smoking chamber positioned within a cabinet, a smoke generating assembly configured for selectively smoldering combustible material to create a flow of smoke, wherein the combustible material is discharged through a discharge port, and a water extinguishing assembly. The water extinguishing assembly a container docking station positioned below the discharge port, the container docking station comprising a first docking connector and a water container configured for receipt within the container docking station, the water container comprising a first container connector configured for electrically connecting to the first docking connector when the water container is in an installed position.

18 Claims, 12 Drawing Sheets

(56) References Cited

U.S. PATENT DOCUMENTS

| | | | | | |
|---|---|---|---|---|---|
| 6,067,894 | A * | 5/2000 | Eugster | G01G 19/56 | 99/280 |
| 6,099,882 | A * | 8/2000 | Risner, Jr. | A23B 4/052 | 426/465 |
| 6,323,464 | B1 * | 11/2001 | Cohn | F24F 6/025 | 219/400 |
| 7,987,616 | B2 * | 8/2011 | Bae | D06F 58/203 | 68/5 R |
| 8,042,532 | B2 * | 10/2011 | Kaneko | F24C 15/02 | 219/400 |
| 9,375,021 | B2 * | 6/2016 | Raghavan | F24C 15/327 | |
| 11,698,195 | B2 * | 7/2023 | Song | F24C 15/327 | 219/401 |
| 12,252,834 | B2 * | 3/2025 | Jung | D06F 39/022 | |
| 2004/0226934 | A1 * | 11/2004 | Moore, Jr. | A47J 27/16 | 219/401 |
| 2006/0249136 | A1 * | 11/2006 | Reay | F24C 15/327 | 126/20 |
| 2007/0114222 | A1 * | 5/2007 | Shon | A21B 3/04 | 219/401 |
| 2008/0078243 | A1 * | 4/2008 | Jeon | A47J 27/04 | 73/290 R |
| 2008/0307978 | A1 * | 12/2008 | Bassoli | A23B 4/052 | 99/474 |
| 2009/0007798 | A1 * | 1/2009 | Yamaguchi | F24C 15/327 | 219/401 |
| 2009/0107188 | A1 * | 4/2009 | Park | D06F 39/40 | 68/5 R |
| 2009/0260246 | A1 * | 10/2009 | Bae | D06F 58/203 | 34/82 |
| 2010/0310733 | A1 * | 12/2010 | Hoffman | F24C 15/02 | 99/473 |
| 2012/0273477 | A1 * | 11/2012 | Park | F24C 15/327 | 99/403 |
| 2013/0008317 | A1 * | 1/2013 | Conrad | A47J 37/067 | 126/39 BA |
| 2014/0096687 | A1 * | 4/2014 | Evans | A47J 43/0727 | 366/144 |
| 2014/0311360 | A1 * | 10/2014 | Bartelick | F24C 15/327 | 219/400 |
| 2015/0059595 | A1 * | 3/2015 | Rand | F24C 15/2035 | 219/401 |
| 2015/0300654 | A1 * | 10/2015 | Gattei | F22B 1/284 | 219/401 |
| 2016/0007798 | A1 * | 1/2016 | Jimenez | A47J 31/56 | 99/283 |
| 2016/0128508 | A1 * | 5/2016 | Mitchell | A47J 31/407 | 141/69 |
| 2019/0223639 | A1 | 7/2019 | Alexander et al. | | |
| 2019/0309956 | A1 * | 10/2019 | Buschman | F24C 13/00 | |
| 2021/0037840 | A1 * | 2/2021 | Garces | A23B 4/056 | |
| 2021/0212329 | A1 * | 7/2021 | Garces | A47J 37/0629 | |
| 2021/0259263 | A1 * | 8/2021 | Carballo | B01D 53/885 | |
| 2022/0395132 | A1 * | 12/2022 | Stacy | A47J 31/469 | |
| 2023/0110059 | A1 * | 4/2023 | Buschman | F24C 15/327 | 219/401 |

OTHER PUBLICATIONS

5 Pair Spring-Loaded Magnetic Pogo Pin Connector 4 Pole Pitch 2.5 Through Hole Angled Male Female 2A 36V DC Power Charge Prove, Aliexpress, https://www.aliexpress.us/item/2255801036573233.html?gatewayAdapt=glo2usa4itemAdapt, accessed May 25, 2023, 13 pages.

* cited by examiner

WATER DETECTION SYSTEM AND METHOD FOR AN INDOOR SMOKER

FIELD OF THE INVENTION

The present subject matter relates generally to indoor smokers, and more particularly to systems and methods of extinguishing consumed material in an indoor smoker.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

Conventional smokers are used outdoors and simply exhaust smoke directly outside through a chimney or vent. Notably, such smoke frequently contains harmful byproducts of the combusted fuel, such as volatile organic compounds (VOCs) or other harmful emissions. These byproducts, as well as the large amount of smoke generated by the combusted fuel, generally prohibit the use of smokers inside the home. Although fume hoods or exhaust systems may be used to route the smoke from indoors to outdoors, such systems would be complex, costly, and frequently not practical or effective.

Certain indoor smokers have been developed that use a catalytic converter to remove harmful emissions and permit indoor operation. However, for any smoking process, but particularly for indoor smokers, precise regulation of the smoldering process is desirable. For example, the quality of smoke produced in smoking appliances is heavily dependent on the temperature at which wood is smoldered and the duration of smoldering process. Smoke produced outside the desired temperature range may impart acrid flavors to the food being smoked. In addition, wood that is completely burned until it turns entirely to ash may produce lower quality smoke. Conventional smokers fail to facilitate precise temperature and duration control of the smoldering process.

For both indoor smokers and outdoor smokers, it may be desirable to have the ability to extinguish the combustible material when desired. For example, it may be desirable to extinguish the combustible material to stop smoke production if the user of the indoor smoker needs to access the smoking chamber, if the smoking process is complete, or if the smoking process otherwise needs to be paused or stopped altogether. Certain conventional smokers include containers that may be filled with water and may extinguish smoldering combustible material by discharging it into the container. However, the amount of water within such containers may frequently fall below a desired amount, e.g., due to evaporation, insufficient filling, or absorption by previously disposed combustible material.

Accordingly, a smoker that has features improving the extinguishing process for combustible material is desirable. More specifically, a smoker that includes feature for conveniently detecting water level within a container would be particularly beneficial.

BRIEF DESCRIPTION OF THE INVENTION

Aspects and advantages of the invention will be set forth in part in the following description, may be apparent from the description, or may be learned through practice of the invention.

In one exemplary embodiment, an indoor smoker defining a vertical direction, a lateral direction, and a transverse direction is provided. The indoor smoker includes a cabinet, a smoking chamber positioned within the cabinet, a smoke generating assembly configured for selectively smoldering combustible material to create a flow of smoke, wherein the combustible material is discharged through a discharge port, and a water extinguishing assembly. The water extinguishing assembly includes a container docking station positioned below the discharge port, the container docking station comprising a first docking connector and a water container configured for receipt within the container docking station, the water container comprising a first container connector configured for electrically connecting to the first docking connector when the water container is in an installed position.

In another exemplary embodiment, a water extinguishing assembly for an indoor smoker is provided. The indoor smoker includes a smoking chamber positioned within a cabinet and a smoke generating assembly configured for selectively smoldering combustible material to create a flow of smoke, wherein the combustible material is discharged through a discharge port. The water extinguishing assembly includes a container docking station positioned below the discharge port, the container docking station comprising a first docking connector and a water container configured for receipt within the container docking station, the water container comprising a first container connector configured for electrically connecting to the first docking connector when the water container is in an installed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
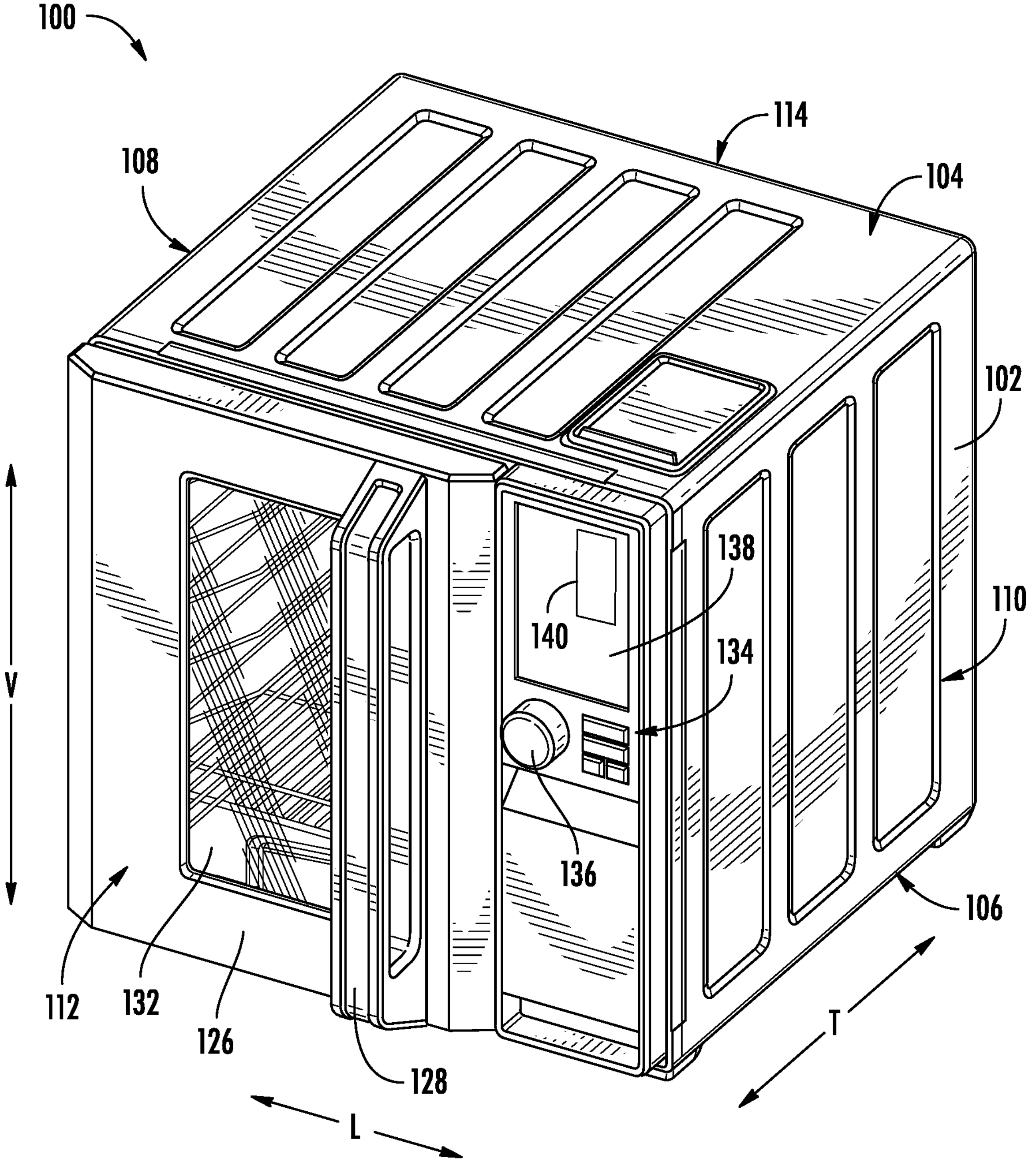
FIG. 1 provides a perspective view of an indoor smoker with a door in a closed position in accordance with an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
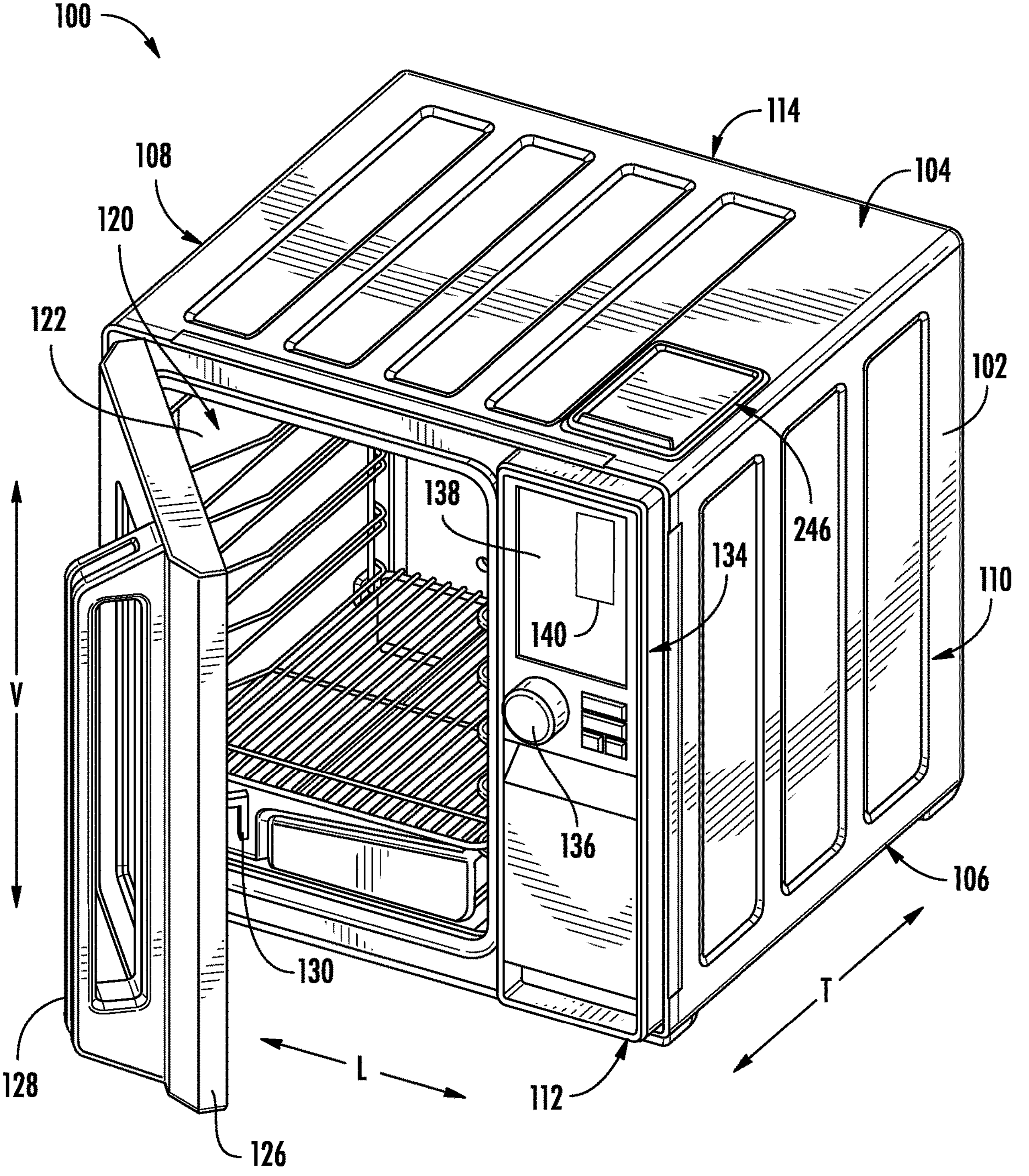
FIG. 2 provides a perspective view the exemplary indoor smoker of FIG. 1 with the door opened.

FIGS. 1 and 2 provide perspective views of an indoor smoker 100 according to an exemplary embodiment of the present subject matter with the door in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulation gap 124 (FIG. 4) defined between chamber walls 122 and cabinet 102. According to an exemplary embodiment, insulation gap 124 is filled with insulating material (not shown), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 (FIG. 2) is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or harmful emissions in an appliance.

Figure 3:
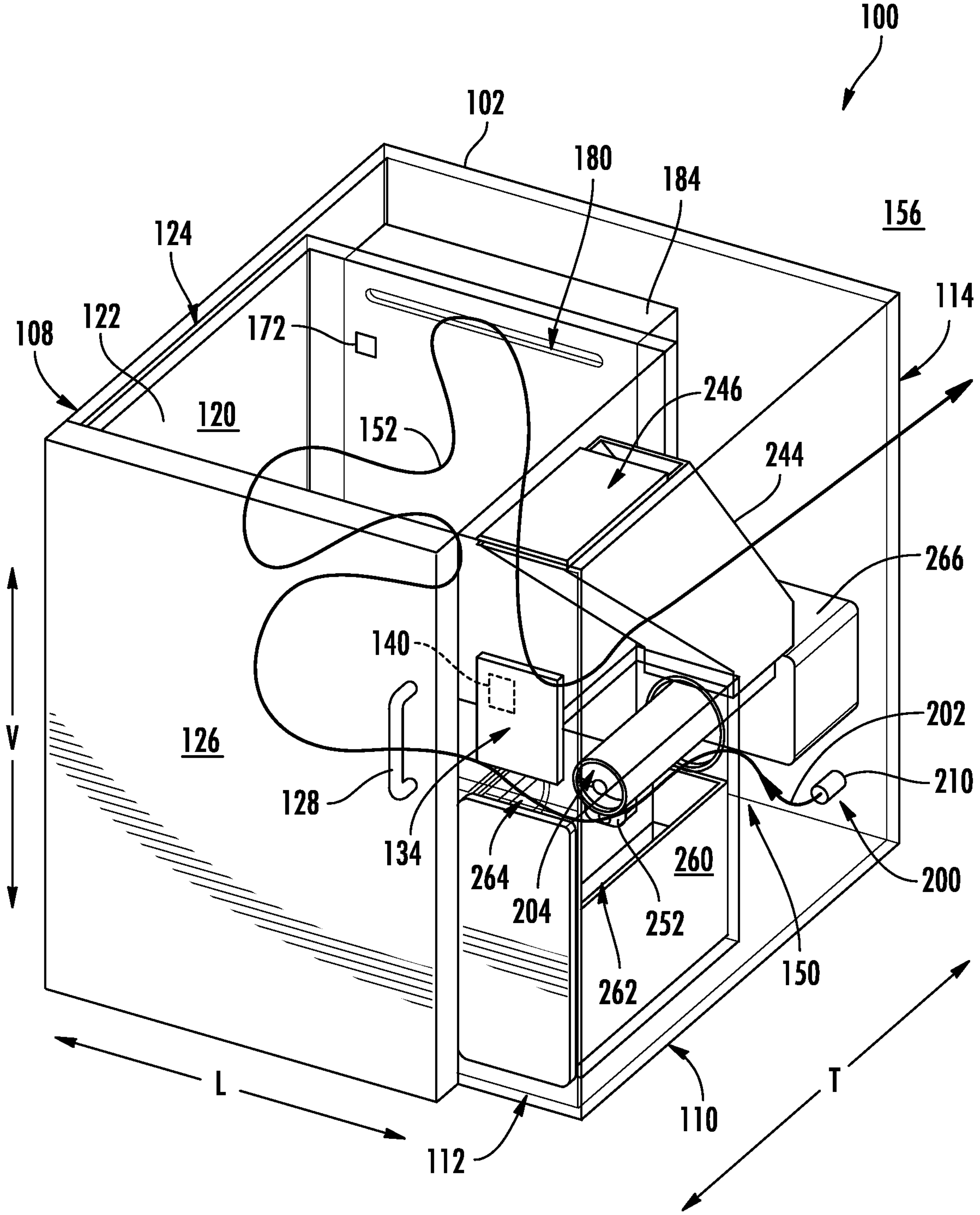
FIG. 3 provides a partial perspective view of the exemplary indoor smoker of FIG. 1 according to an exemplary embodiment of the present subject matter.

Referring now also to FIG. 3, various internal components of an indoor smoker 100 and their respective functions will be described according to an exemplary embodiment of the present subject matter. In this regard, FIG. 3 illustrates a partial perspective view of an indoor smoker 100 similar to that shown in FIG. 1. As shown, indoor smoker 100 generally includes smoking chamber 120 for receiving items to be cooked/smoked, a smoke generating device or smoke generating assembly 150 for generating a flow of smoke (indicated by reference numeral 152 in FIG. 3), and an exhaust system 154 for safely discharging that the air and/or smoke into an indoor environment 156 (i.e., outside of indoor smoker 100). Each of these systems and components will be described in detail below.

Figure 5:
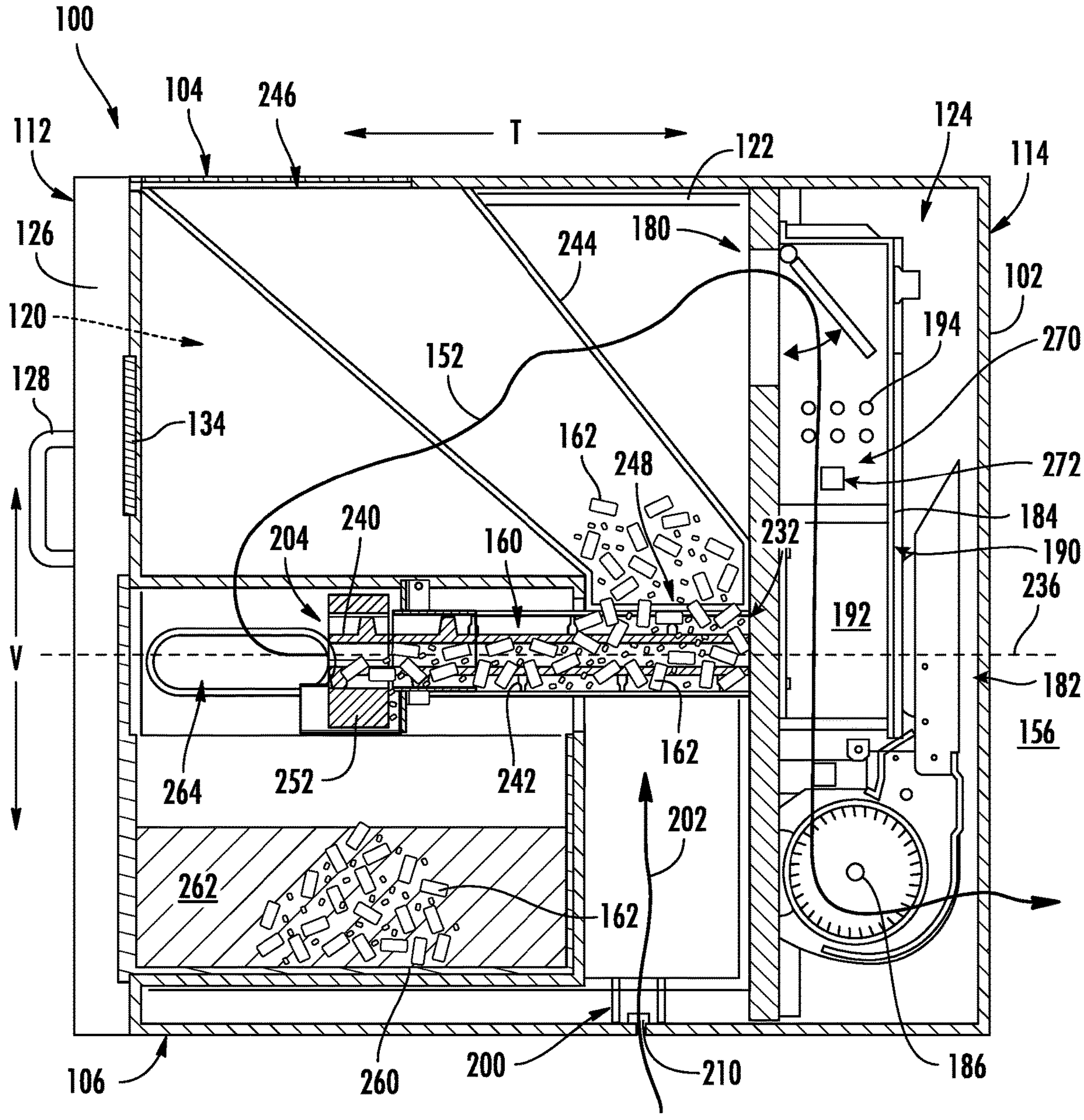
FIG. 5 is a side cross sectional view of the exemplary indoor smoker of FIG. 1 according to an exemplary embodiment of the present subject matter.

Referring to FIG. 5, smoke generating assembly 150 generally defines a smoldering chamber 160 which is configured for receiving combustible material 162. As used herein, "combustible material" is generally used to refer to any suitable material positioned within smoldering chamber 160 for generating smoke. Specifically, according to exemplary embodiments, combustible material 162 includes wood or wood byproducts, such as wood chunks, wood chips, wood pellets, or wood resin. According to the exemplary embodiment, smoke generating assembly 150 may include a door or another access panel (not shown) for providing selective access to smoldering chamber 160, e.g., to add additional combustible material 162.

Figure 4:
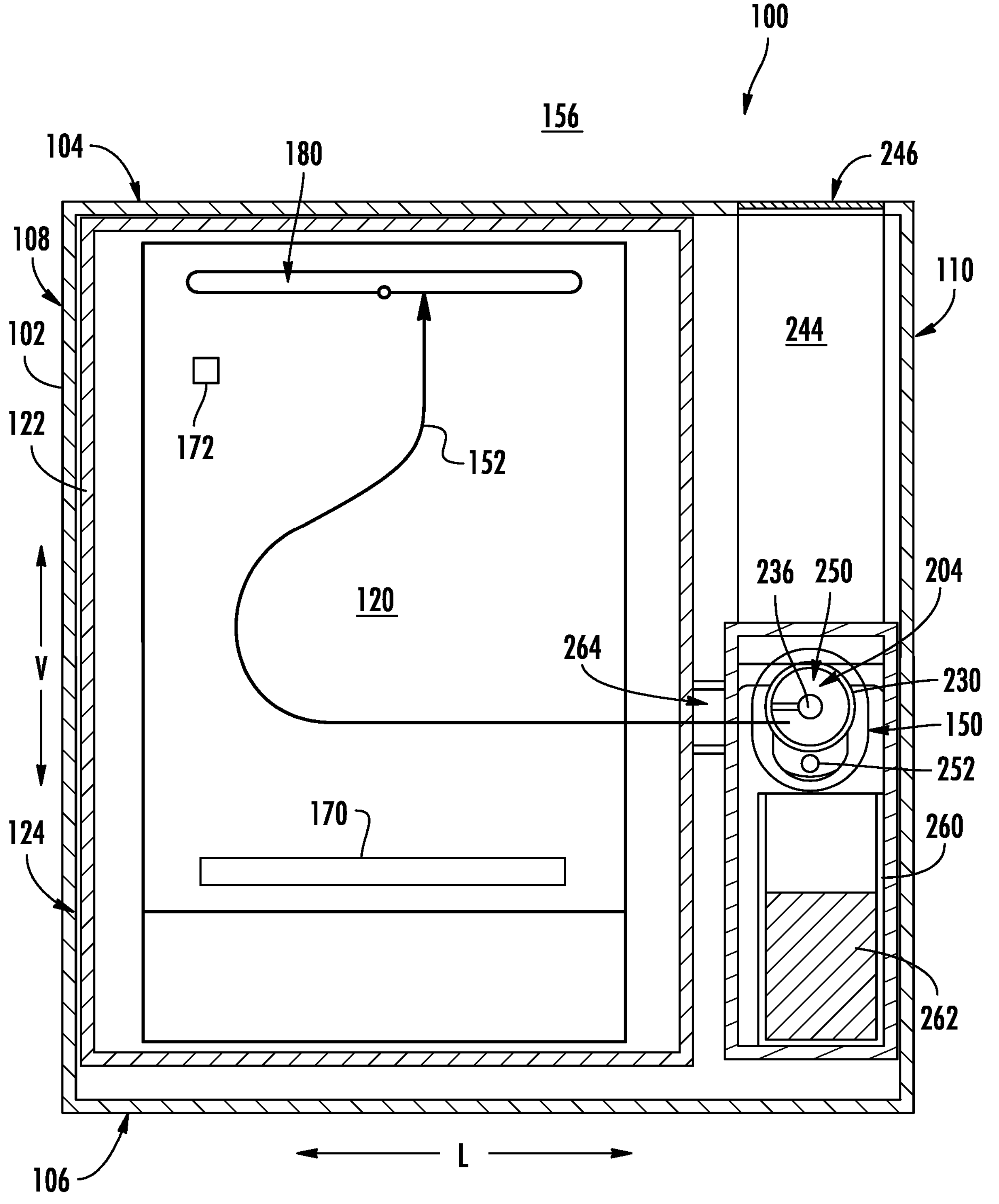
FIG. 4 is a front cross-sectional view of the exemplary indoor smoker of FIG. 1 according to an exemplary embodiment of the present subject matter.

As best shown in FIG. 4, in order to ensure a desirable cooking temperature within smoking chamber 120, indoor smoker 100 further includes a chamber heater 170 that is positioned within or otherwise in thermal communication with smoking chamber 120 for regulating the temperature in smoking chamber 120. In general, chamber heater 170 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 170 is operated independently of smoke generating assembly 150 (e.g., as described below), smoking chamber 120 may be maintained at any suitable temperature during a smoking process. More specifically, for example, chamber heater 170 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors which are generally operable to measure the internal temperature in indoor smoker 100, e.g., within smoking chamber 120 and/or smoldering chamber 160. More specifically, as illustrated, indoor smoker 100 includes a temperature sensor 172 positioned within smoking chamber 120 and being operably coupled to controller 140. In some embodiments, controller 140 is configured to vary operation of chamber heater 170 based on one or more temperatures detected by temperature sensor 172.

As described herein, "temperature sensor" may refer to any suitable type of temperature sensor. For example, the temperature sensors may be thermocouples, thermistors, or resistance temperature detectors. In addition, temperature sensor 172 may be mounted at any suitable location and in any suitable manner for obtaining a desired temperature measurement, either directly or indirectly. Although exemplary positioning of certain sensors is described below, it should be appreciated that indoor smoker 100 may include any other suitable number, type, and position of temperature sensors according to alternative embodiments.

As mentioned briefly above, indoor smoker 100 further includes an exhaust system 154 which is generally configured for safely discharging the flow of smoke 152 from indoor smoker 100. Specifically, according to the illustrated embodiment, exhaust system 154 generally extends between a chamber outlet 180 and a discharge vent 182 defined by cabinet 102 for directing the flow of smoke 152 from smoking chamber 120 to the environment 156. Although an exemplary exhaust system 154 is described below, it should be appreciated that variations and modifications may be made while remaining within the scope of the present subject matter. For example, the routing of ducts, the catalytic converter arrangement, and the types of sensors used may vary according to alternative embodiments. For example, although discharge vent 182 is illustrated as being defined proximate a top and back of cabinet 102, other suitable positions of discharge vent 182 and routing of the exhaust are possible and within the scope of the present subject matter.

As shown, exhaust system 154 includes an exhaust duct 184 that generally extends between and provides fluid communication between chamber outlet 180 and discharge vent 182. Indoor smoker 100 further includes an air handler 186 that is operably coupled with exhaust duct 184 facilitating the smoldering process and smoke generating process. For example, air handler 186 urges the flow of smoke 152 through exhaust duct 184 and out of discharge vent 182 to environment 156. According to the illustrated exemplary embodiment, air handler 186 is a centrifugal fan positioned within exhaust duct 184. However, it should be appreciated that according to alternative embodiments, air handler 186 may be positioned at any other suitable location and may be any other suitable fan type, such as a tangential fan, an axial fan, etc.

In addition, according to an exemplary embodiment, air handler 186 is a variable speed fan such that it may rotate at different rotational speeds, thereby generating different air flow rates. In this manner, the amount of smoke drawn from smoldering chamber 160 may be continuously and precisely regulated. Moreover, by pulsing the operation of air handler 186 or throttling air handler 186 between different rotational speeds, the flow of smoke 152 drawn into smoking chamber 120 may enter from a different direction, may have a different flow velocity, or may generate a different flow pattern within smoking chamber 120. Thus, by pulsating the variable speed fan or otherwise varying its speed, the flow of smoke 152 may be randomized, thereby eliminating stagnant regions within smoking chamber 120 and better circulating the flow of smoke 152 to provide a more even cooking/smoking profile.

As illustrated, indoor smoker 100 further includes a catalytic converter 190 which is positioned within exhaust duct 184 for lowering or removing volatile organic compounds (VOCs) from the flow of smoke 152. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 190 generally includes a catalytic element 192 and a catalyst heater 194. Although catalytic converter 190 is illustrated herein as being positioned within exhaust duct 184, it should be appreciated that according to other embodiments catalytic converter 190 be positioned at any other suitable location, so long as catalytic converter 190 is inline with the flow of smoke 152, such that volatile organic compounds may be reduced.

In general, catalytic element 192 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 192 may combine oxygen ($O_2$) with carbon monoxide (CO) and unburned hydrocarbons to produce carbon dioxide ($CO_2$) and water ($H_2O$). In addition, according to exemplary embodiments, catalytic element 192 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 194 is in thermal communication with catalytic element 192 for heating it to a suitable temperature, such as approximately 800° F. According to the illustrated embodiment, catalyst heater 194 is positioned upstream of catalytic element 192 to provide thermal energy through convection. However, it should be appreciated that according to alternative embodiments, catalyst heater 194 may be in direct contact with catalytic element 192 to provide thermal energy through conduction, or may be thermally coupled to catalytic element 192 in any other suitable manner. In order to ensure a catalyst temperature of catalytic element 192 remains above a temperature suitable for controlling emissions, indoor smoker 100 may further include a catalyst temperature sensor (not shown) that may be monitored by controller 140.

Referring still to FIG. 5, the construction and operation of smoke generating assembly 150 will be described in more detail according to an exemplary embodiment of the present subject matter. As illustrated, indoor smoker 100 defines an air inlet 200 for receiving air to support the combustion or smoldering process. Specifically, air inlet 200 is configured for receiving a flow of combustion air (indicated by reference numeral 202 in FIG. 5) from the ambient environment 156 surrounding indoor smoker 100 or from another air supply source. During a smoking process, combustible material 162 is ignited and the flow of combustion air 202 supports the smoldering process to generate the flow of smoke 152. Smoke generating assembly 150 further defines a smoke outlet 204 for providing a flow of smoke 152 into smoking chamber 120 during a smoking operation, as will be described in detail below.

In addition, indoor smoker 100 may further include features for preventing or regulating the flow of combustion air 202 from entering indoor smoker 100 from environment 156 when the flow of such air is not desired. In this regard, for example, indoor smoker 100 may include an inlet check valve 210 which is operably coupled to air inlet 200. In general, this check valve prevents the flow of combustion air 202 from entering smoldering chamber 160 when not desired. For example, inlet check valve 210 may have a "cracking pressure," which is used herein to refer to the pressure, or more precisely the negative pressure, required within smoldering chamber 160 to open inlet check valve 210. In this manner, inlet check valve 210 may be designed to permit the flow of combustion air 202 only when air handler 186 is operating and urging air through smoldering chamber 160, thus facilitating the quick and effective asphyxiation of combustible material 162 within smoldering chamber 160 when desired.

According to the illustrated embodiment, smoke generating assembly 150 generally includes a smoke barrel 230 that defines smoldering chamber 160. Specifically, smoke barrel 230 extends between a first end 232 and a second end 234 substantially along a central axis 236. Specifically, as illustrated, central axis 236 extends substantially within a horizontal plane within cabinet 102, e.g., directly along the transverse direction T. In general, smoke barrel 230 is configured for receiving the combustible material 162 and facilitating a smoldering process. As shown, smoke barrel 230 has a substantially cylindrical shape and is formed from a substantially rigid and temperature resistant material, such as steel. However, it should be appreciated that smoke barrel 230 may be formed from different materials, may have different geometries, and may be configured differently within cabinet 102 according to alternative embodiments of the present subject matter.

Smoke generating assembly 150 further includes a rotating auger 240 that is rotatably mounted within smoldering chamber 160 and generally rotates about central axis 236, e.g., such that rotating auger 240 is coaxial with smoke barrel 230. As shown, an outer diameter of rotating auger 240 is substantially equivalent to an inner diameter of smoke barrel 230, such that a helical blade 242 of rotating auger 240 may advance combustible material 162 within smoldering chamber 160 as rotating auger 240 is rotated about central axis 236. More specifically, the combustible material 162 is generally urged from first end 232 toward second end 234 of smoke barrel 230.

As illustrated, smoke generating assembly 150 may further include a hopper 244 that is generally configured for storing and selectively depositing combustible material 162 into smoldering chamber 160. More specifically, as illustrated, hopper 244 may be a large, tapered reservoir with a top opening 246 positioned at top 104 of cabinet 102. A user may fill hopper 244 by pouring or providing combustible material 162 into hopper 244 through top opening 246. Hopper 244 may taper toward a supply opening 248 positioned at a bottom of hopper 244. As shown, supply opening 248 opens into smoldering chamber 160 at a top of smoke barrel 230. More specifically, supply opening 248 is joined to smoke barrel 230 proximate first end 232 of smoke barrel 230. In this manner, fresh combustible material 162 is typically provided into smoldering chamber 160 proximate first end 232 of smoke barrel 230 and is urged by rotating auger 240 toward second end 234 of smoke barrel 230. As illustrated, smoke generating assembly 150 may generally define a discharge port 250 proximate second end 234 of smoke barrel 230 for discharging consumed combustible material 162.

Smoke generating assembly 150 further includes one or more smoldering heaters 252 which are positioned adjacent smoldering chamber 160 or otherwise placed in thermal communication with combustible material 162 stored in smoldering chamber 160 for smoldering combustible material 162. According to an exemplary embodiment, smoldering heater 252 may include one or more cartridge heaters or silicon nitride igniters. Alternatively, smoldering heater 252 may include any other suitable type, position, and configuration of heating elements. As used herein, the term "heating element," "heaters," and the like may generally refer to electric resistance heating elements, gas burners, microwave heating elements, halogen heating elements, or suitable combinations thereof.

As used herein, the verb "smolder" or variations thereof is intended to refer to burning a combustible material (e.g., combustible material 162) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 252 positioned within smoldering chamber 160. For typical combustible material used in smokers, e.g., wood and wood byproducts, a typical smoldering temperature is between about 650° F. and 750° F. However, the exact temperature may vary depending on the combustible material used, the air flow rate through smoldering chamber 160, the level of combustible material 162, and other factors.

According to the exemplary illustrated embodiment, smoldering heater 252 is positioned proximate second end 234 of smoke barrel 230. For example, smoldering heater 252 may at least partially define smoke outlet 204 of smoke generating assembly 150. Specifically, as illustrated, smoke outlet 204 corresponds to discharge port 250 of smoke generating assembly 150, which may simply be an open end of smoldering heater 252. In this manner, as rotating auger 240 rotates, combustible material 162 positioned within smoldering chamber 160 is slowly but progressively advanced past smoldering heater 252. After combustible material 162 positioned near smoldering heater 252 is consumed or smoldered, rotating auger 240 may rotate to advance the consumed material toward discharge port 250 where it may be pushed out of smoldering chamber 160.

According to exemplary embodiments, smoldering heater 252 may be positioned on a distal end of rotating auger 240, e.g., aligned along central axis 236 proximate second end 234. As such, rotating auger 240 may pass through smoke barrel 230 and through a central aperture smoldering heater 252 to extend out of discharge port 250. In this manner, rotating auger 240 may serve to advance combustible material 162 from first end 232 of smoke barrel 230, past second end 234 of smoke barrel 230, through and across smoldering heater 252, then out of discharge port 250.

According to an exemplary embodiment, a water extinguishing assembly 260 may be configured for receiving consumed combustible material 162 when discharged from smoke generating assembly 150. In this regard, for example, water extinguishing assembly 260 may be positioned directly below smoke barrel 230, smoldering heater 252, and/or discharge port 250 such that used combustible material 162 may fall therein and immediately extinguish. For example, according to the illustrated embodiment, water extinguishing assembly 260 is filled with water 262 to immediately extinguish combustible material 162 when dropped into water extinguishing assembly 260. However, it should be appreciated that other liquids or materials for extinguishing combustible material 162 may be contained within water extinguishing assembly 260. In addition, as illustrated, water extinguishing assembly 260 may be positioned a chamber inlet 264 that is positioned adjacent smoke outlet 204. In this manner, the flow of smoke 152 exiting smoke barrel 230 may pass directly into smoking chamber 120 through chamber inlet 264 while consumed combustible material 162 may fall directly into water 262 within water extinguishing assembly 260. Water extinguishing assembly 260 will be described in more detail with respect to FIGS. 8 through 11.

Figure 6:
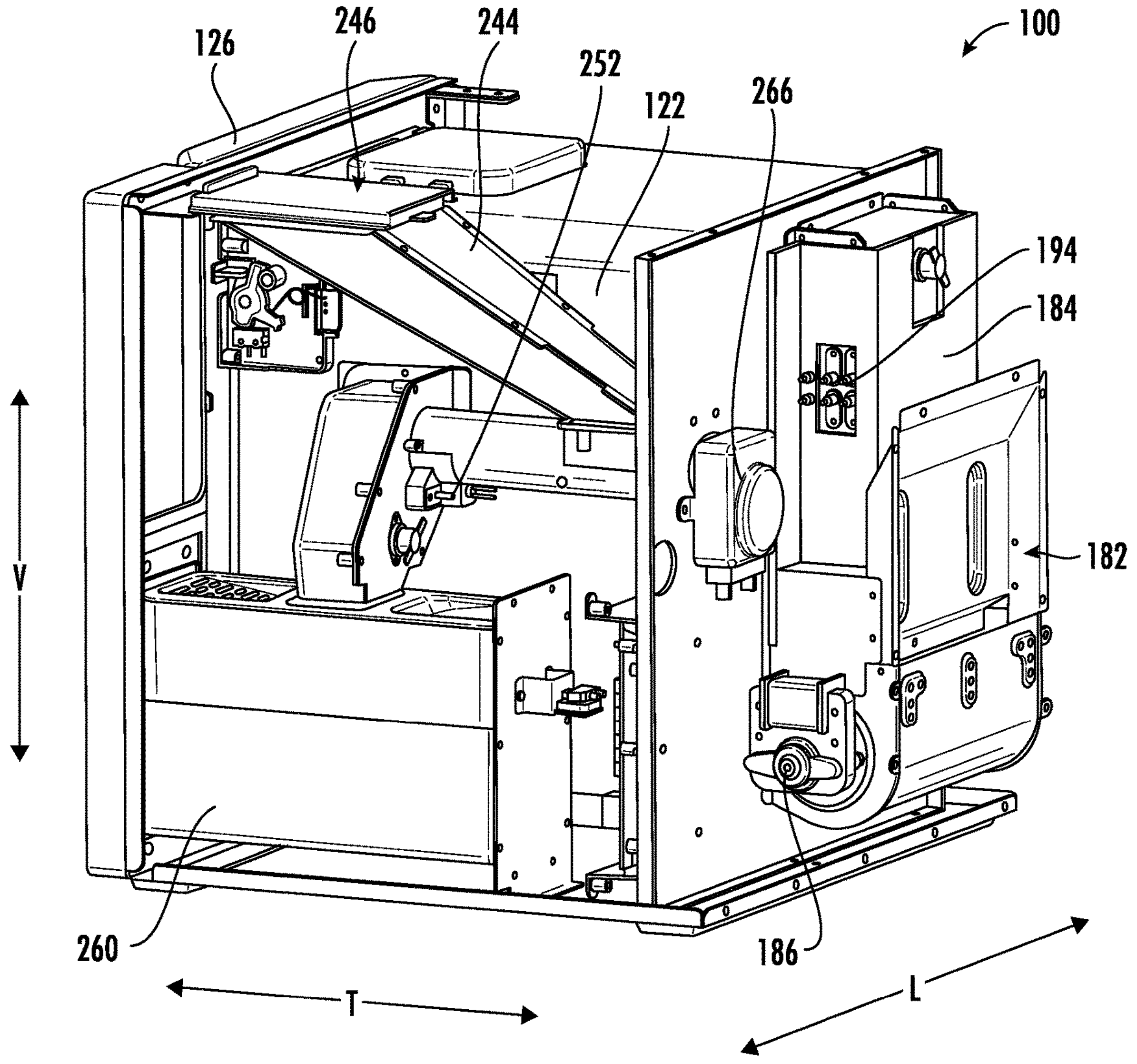
FIG. 6 provides another partial perspective view of the exemplary indoor smoker of FIG. 1 according to an exemplary embodiment of the present subject matter.
Figure 7:
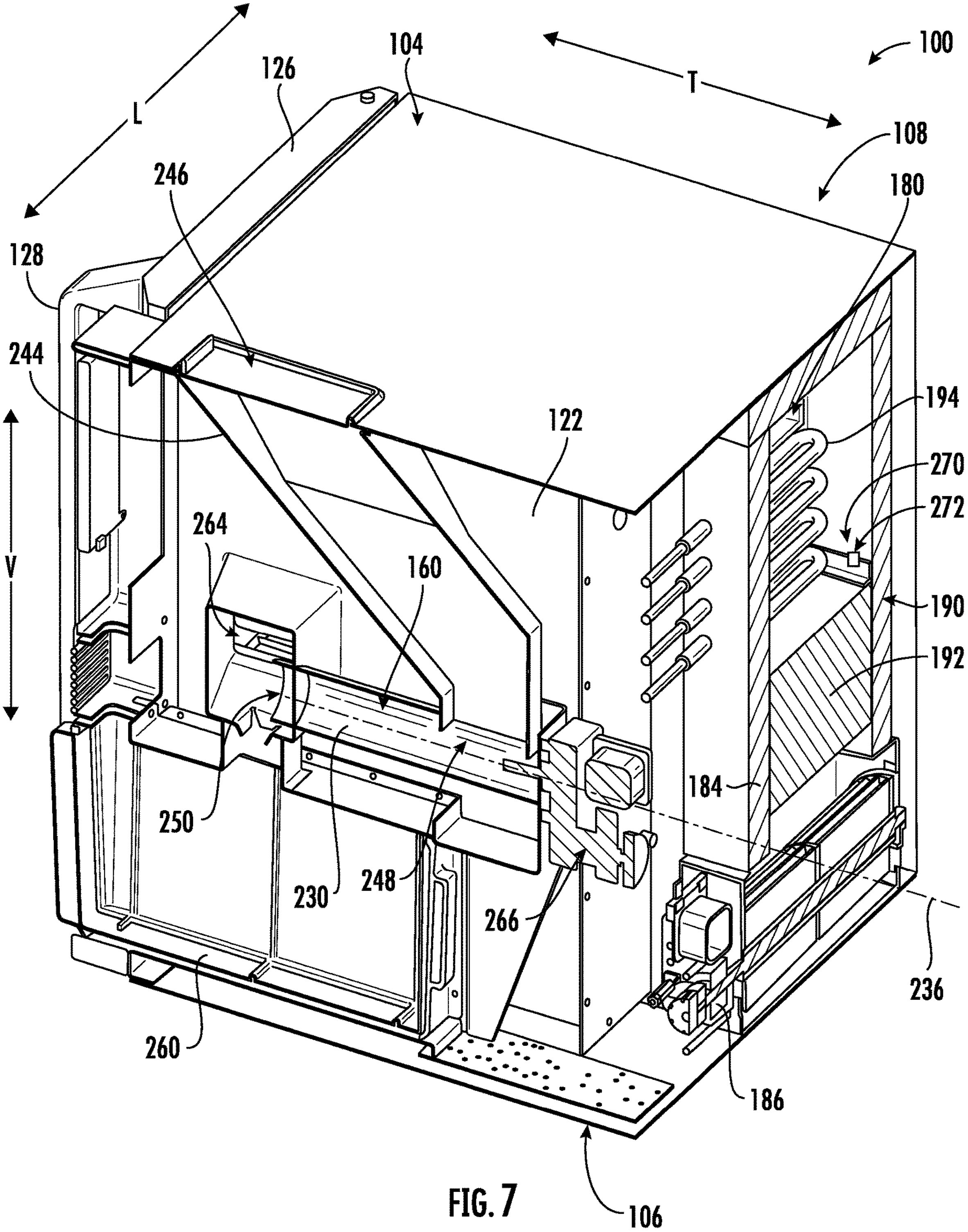
FIG. 7 provides another partial perspective view of the exemplary indoor smoker of FIG. 1 according to an exemplary embodiment of the present subject matter.

As best illustrated in FIGS. 6 and 7, smoke generating assembly 150 may further include a drive mechanism 266 that is mechanically coupled to rotating auger 240. Controller 140 (or another dedicated controller) may be in operative communication with drive mechanism 266 and may be configured for intermittently rotating the rotating auger 240 to advance combustible material 162 along central axis 236. Specifically, drive mechanism 266 may include a drive motor and a transmission assembly or another suitable geared arrangement for transferring torque from the drive motor to rotating auger 240. As used herein, "motor" may refer to any suitable drive motor and/or transmission assembly for driving rotating auger 240. For example, the drive motor may be a brushless DC electric motor, a stepper motor, or any other suitable type or configuration of motor. For example, the drive motor may be an AC motor, an induction motor, a permanent magnet synchronous motor, or any other suitable type of AC motor. In addition, the drive motor and the transmission assembly may include any suitable motor or transmission sub-assemblies, clutch mechanisms, or other components.

In order to facilitate proper smoldering of combustible material 162, it may be desirable to drive rotating auger 240 intermittently, e.g., in a non-continuous manner. Specifically, according to an exemplary embodiment, rotating auger 240 may be rotated for a particular time duration once during every predetermined rotation period. For example, the time duration of rotation may be the amount of time drive mechanism 266 should drive rotating auger 240 to discharge all combustible material 162 that is smoldering from smoke barrel 230. In addition, the predetermined rotation period may be the amount of time necessary for a fresh portion of the smoldering material 162 to be consumed. Notably, drive mechanism 266 may discharge combustible material 162 from smoke barrel 230 before combustible material 162 is fully consumed, e.g., to prevent forming ash which may introduce acrid smoke flavors. According to an exemplary embodiment, the time duration of rotation is approximately 12 seconds while the predetermined rotation period is three minutes. Other rotation schedules are possible and within the scope of the present subject matter. Indeed, such rotation schedules may vary based on a variety of factors, such as the combustible material used, the temperature of the smolder-ing heater, the rate of air flow through smoke barrel 230, etc.

Thus, during operation of indoor smoker 100, air handler 186 draws the flow of combustion air 202 into smoldering chamber 160 through air inlet 200. The flow of combustion air 202 and combustible material 162 in the smoldering chamber 160 generate the flow of smoke 152 which is drawn into smoking chamber 120 as described herein. The flow of smoke 152 passes through smoking chamber 120 for performing a smoking process on food items positioned therein before exiting smoking chamber 120 through chamber outlet 180. Air handler 186 then continues to urge the flow of smoke 152 through catalytic converter 190 and exhaust duct 184 before passing out discharge vent 182.

Referring now generally to FIGS. 5 and 7, indoor smoker 100 may further include an air quality monitoring system 270 that is generally configured to monitor the quality of the flow of smoke 152 passing through exhaust system 154. For example, air quality monitoring system 270 may be operably coupled to or positioned within exhaust duct 184 for monitoring the flow of smoke 152 and the operation of catalytic converter 190. In general, controller 140 (or another suitable controller) may be in operative communication with air quality monitoring system 270 and other components of indoor smoker 100 for operating indoor smoker 100 and implementing one or more steps of the methods described herein.

According to example embodiments of the present subject matter, air quality monitoring system 270 may include one or more air quality sensors (identified herein generally by reference numeral 272) that are configured for monitoring the flow of smoke 152. For example, air quality sensors 272 may be positioned and configured for providing data related to any suitable qualitative or quantitative condition of the flow of smoke 152. For example, air quality sensors 272 may include sensors for measuring at least one of carbon monoxide, formaldehyde, or other volatile organic compounds (VOCs). These air quality sensors 272 may provide feedback regarding VOCs to controller 140 in any suitable manner and in any suitable unit of measure, e.g., such as total volume, parts per million (ppm), etc. According to still other embodiments, air quality sensors 272 may include one or more optical sensors for detecting particulate matter within the flow of smoke 152.

In addition, it should be appreciated that air quality sensors 272 may be positioned at any suitable location for monitoring the flow of smoke 152. For example, according to an example embodiment, air quality monitoring system 270 may include a single air quality sensor 272 positioned downstream of catalytic element 192. In this regard, for example, air quality sensor 272 may be positioned between catalytic element 192 and air handler 186 within exhaust duct 184. In this manner, the air quality may be sensed immediately downstream of catalytic element 192 for improved measurement precision. According to still other embodiments, air quality sensor 272 may be positioned downstream of air handler 186, e.g., within discharge vent 182. According to still other embodiments, air quality sensor 272 may be positioned within the room where indoor smoker 100 is located and may be directly wired to controller 140 or configured for communicating wirelessly with controller 140.

Referring now generally to FIGS. 8 through 12, water extinguishing assembly 260 will be described in more detail according to example embodiments of the present subject matter. Although water extinguishing assembly 260 is described herein as being used with indoor smoker 100, it should be appreciated that aspects of the present subject matter may be equally applicable to other smoking apparatus applications. Moreover, the specific constructions described herein are only exemplary and are not intended to limit the scope of the present subject matter in any manner.

Figure 8:
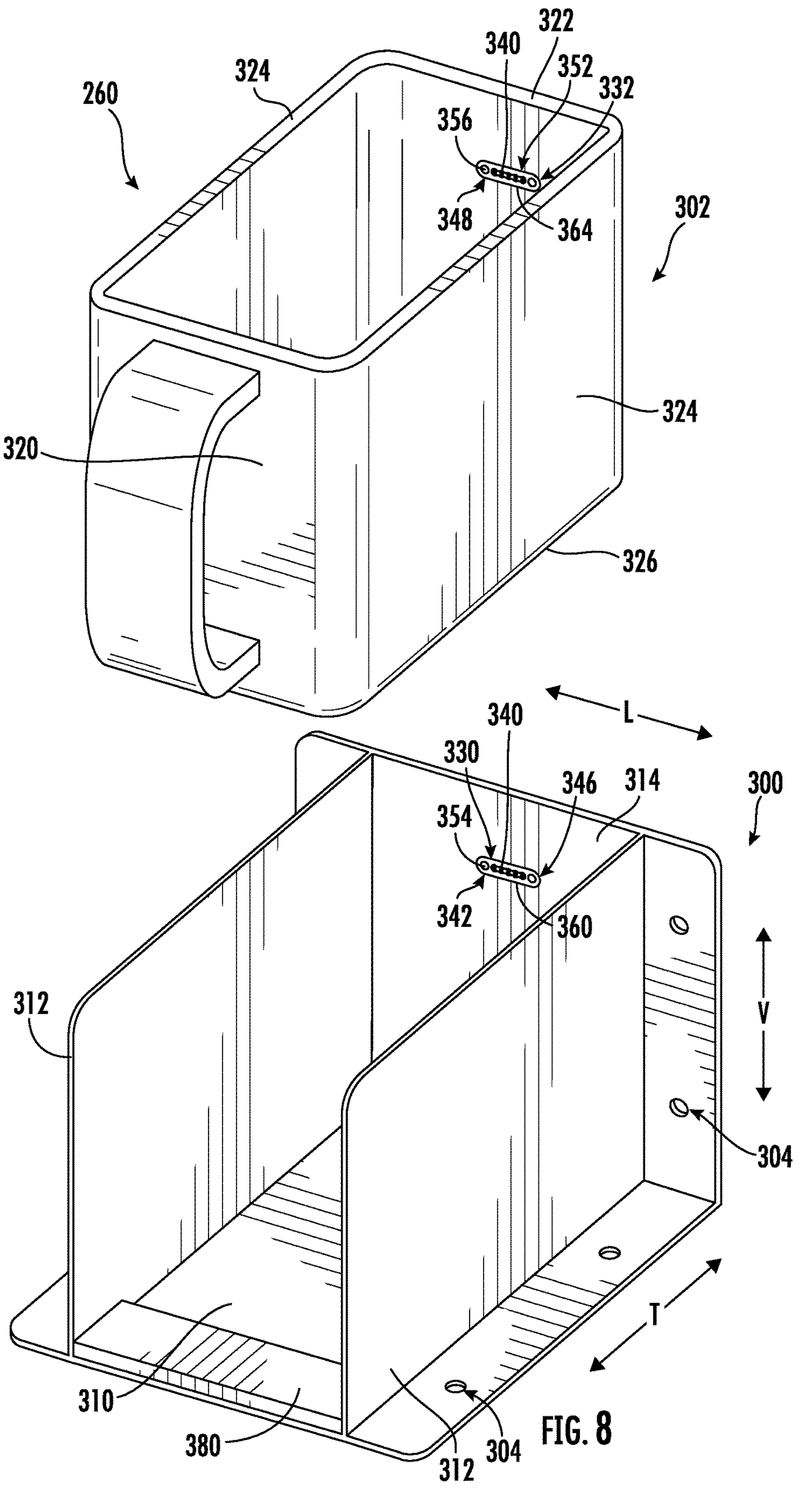
FIG. 8 provides a perspective view of a water extinguishing assembly that may be used with the exemplary indoor smoker of FIG. 1 according to an exemplary embodiment of the present subject matter, where a water container is removed from a container docking station.
Figure 9:
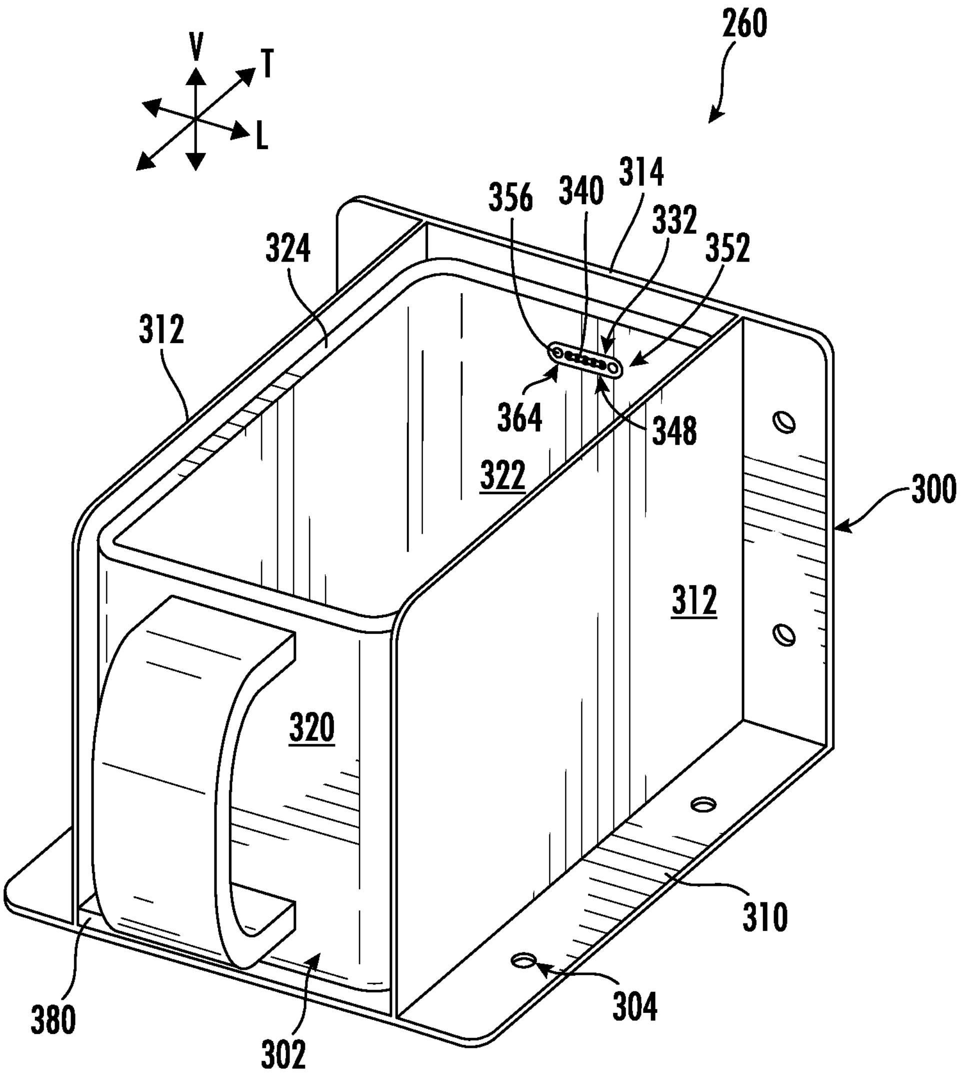
FIG. 9 provides a perspective view of the exemplary water extinguishing assembly of FIG. 8, where the water container is installed in the container docking station.

As illustrated, water extinguishing assembly 260 generally includes a container docking station 300 that is positioned below discharge port 250 of smoke generating assembly 150. In addition, water extinguishing assembly 260 includes a water container 302 that is configured for receipt within container docking station 300. As best shown in FIGS. 8 and 9, container docking station 300 may be fixed within indoor smoker 100, e.g., by inserting mechanical fasteners through one or more apertures 304 defined in container docking station 300, the fasteners then being attached directly to cabinet 102. By contrast, water container 302 may be a removable reservoir that can be filled with water 262 and may be periodically removed from indoor smoker 100 to discard consumed combustible material 162 and/or water 262 (as described above).

Notably, as explained above, water extinguishing assembly 260 must include a sufficient amount of water 262 for properly and fully extinguishing combustible material 162 as it is discharged from discharge port 250 of smoke generating assembly 150. However, liquid within water container 302 may periodically need to be refilled, e.g., due to the buildup of consumed material, due to the evaporation of water, etc. Accordingly, aspects of the present subject matter are generally directed to a system for assessing water levels within water container 302 and determining when water container 302 of water extinguishing assembly 260 has sufficient water to facilitate continued operation of indoor smoker 100.

As illustrated, container docking station 300 may generally include a bottom wall 310, two sidewalls 312 spaced apart along the lateral direction L, and a rear wall 314 which generally define a docking space for receiving water container 302. In addition, water container 302 may generally include a front wall 320 and a rear wall 322 spaced apart along the transverse direction T, two sidewalls 324 spaced apart along the lateral direction L, and a bottom wall 326. When water container 302 is properly installed, bottom wall 326 of water container 302 is seated on a bottom wall 310 of container docking station 300 and rear wall 322 of water container 302 is contacting or positioned against rear wall 314 of container docking station 300.

As explained in more detail below, container docking station 300 may include one or more docking connectors (e.g., referred to generally herein by reference numeral 330) and water container 302 may include one or more container connectors (e.g., referred to generally herein by reference numeral 332). The docking connectors 330 and container connectors 332 are intended to contact each other when water container 302 is properly installed within container docking station 300. In addition, these docking connectors 330 and container connectors 332 are designed to ensure proper installation of water container 302 as well as facilitate water level detection. Although one exemplary configuration of docking connectors 330 and container connectors 332 are described below, it should be appreciated that aspects of the present subject matter may include a different number, type, position, and configuration of these connectors while remaining within the scope present subject matter.

In general, each docking connector 330 and each container connector 332 may have a similar construction, so like reference numerals may be used to identify the same or similar features in the figures. An example docking connector 330 will now be described. Docking connector 330 may include a plurality of electrical contacts 340 that extend from a front surface 342 to a rear surface 344 of docking connector 330. According to the illustrated embodiment, docking connector 330 is mounted in an aperture 346 defined in rear wall 314 of container docking station 300. In this manner, when properly installed, docking connector 330 provides an electrical contact on each side of rear wall 314. In other words, electrical contacts 340 extend through rear wall 314, e.g., from an interior of container docking station 300 to an exterior of container docking station 300. Although docking connectors 330 are illustrated as having four electrical contacts 340, any other suitable number and configuration may be used (e.g., two contacts may be used to establish an electrical circuit as described below).

Similarly, container connector 332 may include a plurality of electrical contacts 340 that extend from a front surface 348 to a rear surface 350 of container connector 332. According to the illustrated embodiment, container connector 332 is mounted in an aperture 352 defined in rear wall 322 of water container 302. In this manner, when properly installed, container connector 332 provides an electrical contact on each side of rear wall 322. In other words, electrical contacts 340 extend through rear wall 322, e.g., from an interior reservoir of water container 302 to an exterior or outer wall of water container 302. Although container connectors 332 are illustrated as having four electrical contacts 340, any other suitable number and configuration may be used (e.g., two contacts may be used to establish an electrical circuit as described below).

In operation, controller 140 of indoor smoker 100 may be electrically connected to each docking connector 330. Specifically, controller 140 may be electrically coupled to the electrical contacts 340 for detecting a resistance between the electrical contacts. In this regard, controller 140 may be configured to detect electrical continuity and/or electrical discontinuity through the electrical contacts. When water container 302 is properly seated within container docking station 300, electrical contacts 340 of container connectors 332 may be in direct electrical contact with electrical contacts 340 of docking connectors 330. Accordingly, controller 140 may also sense continuity across container connector 332 when water container 302 is properly installed.

Notably, if the water level within water container 302 is at or higher than the location of container connector 332, the water may close the circuit between electric contacts 340, and this closed circuit may be detectable as electrical continuity of the sensing circuit via controller 140. Accordingly, if continuity is detected, controller 140 may know that water container 302 is properly installed and that the water level is above that particular container connector 332. By contrast, if continuity is not detected, controller 140 may know that the water level is below container connector 332 or the water container 302 is not properly installed.

Notably, it may be desirable to ensure good contact between docking connectors 330 and container connectors 332. Accordingly, in an example embodiment, container docking station 300 may include one or more docking magnets 354 and water container 302 may include one or more container magnets 356 that are positioned to create a magnetic attraction that pulls water container 302 into the properly installed position within container docking station 300. Specifically, as water container 302 approaches the installed position, a magnetic force between docking magnets 354 and container magnets 356 secures water container 302 in container docking station 300 in the installed position. According to the illustrated example embodiment, docking magnets 354 are integrated into docking connectors 330 to form a single unit (e.g., with two docking magnets 354 on opposite sides of electrical contacts 340). Similarly, container magnets 356 are integrated into container connectors 332 to form a single unit (e.g., with two container magnets 356 on opposite sides of electrical contacts 340).

Referring now to the specific embodiment illustrated in the FIGS. 8 through 12, container docking station 300 includes a first docking connector 360 (e.g., the upper docking connector 330) mounted at a first height on rear wall 314 of container docking station 300 and a second docking connector 362 (e.g., the lower docking connector 330) mounted at a second height on rear wall 314 of container docking station 300. Specifically, as illustrated, the first height is associated with a maximum water level and the second height is associated with a minimum water level. These heights may be determined in any suitable manner for providing feedback regarding the levels of water within water container 302. In addition, although only two docking connectors 330 an associated water levels are detected in the present configuration, it should be appreciated that the number, type, configuration, and positioning of such connectors may be changed while remaining within the scope of the present subject matter.

Similarly, water container 302 includes a first container connector 364 (e.g., the upper container connector 332) mounted at a first height on rear wall 322 of water container 302 and a second container connector 366 (e.g., the lower container connector 332) mounted at a second height on rear wall 322 of water container 302. Specifically, as illustrated, the first height is associated with a maximum water level and the second height is associated with a minimum water level. These heights may be determined in any suitable manner for providing feedback regarding the levels of water within water container 302. Notably, when water container 302 is properly installed within container docking station 300, first docking connector 360 is electrically coupled to first container connector 364 and second docking connector 362 is electrically coupled to second container connector 366.

As explained above, controller 140 of indoor smoker 100 may be in operative communication with docking connectors 330. Based on continuity (or discontinuity) detected at docking connectors 330, controller may determine whether water container 302 is properly installed, and if so, whether there is insufficient water, whether the water exceeds a low level, whether the water exceeds a high level, etc. In general, the docking connectors 330 and container connectors 332 may be positioned at any suitable height to ensure that the water within water container 302 is sufficient to facilitate safe and efficient operation of indoor smoker 100.

Controller 140 may be further configured to implement responsive action based on the continuity detected at docking connectors 330. For example, if there is discontinuity at all docking connectors 330, this may indicate that water container 302 is not properly installed or contains insufficient water, so the responsive action may include stopping the operation of indoor smoker 100. If the second docking connector 362 has continuity but the first docking connector 360 has discontinuity, this may indicate that the water container 302 is properly installed and there is at least a minimum level of water contained therein. If the docking connectors 330 are positioned for indicating when water is approaching a low state, controller 140 may make an operating parameter adjustment that might reduce the consumption of combustible material (e.g., such as slowing down or stopping smoke generating assembly 150).

In addition, controller 140 may provide a user notification when the continuity (or discontinuity) at docking connectors 330 indicates that corrective action or user intervention is needed. For example, controller may provide a user notification that the water container 302 is not present, that there is an insufficient volume of water in the water container 302, that there is an appropriate volume of water in the water container 302, that the water level exceeds a predetermined threshold, etc. It should be appreciated that this user notification may be provided via user interface panel 134 or directly to a consumer through a remote device (e.g., such as through a wireless network in a mobile phone). If controller 140 determines that the water level is appropriate, controller 140 may permit standard operation of indoor smoker 100.

Figure 10:
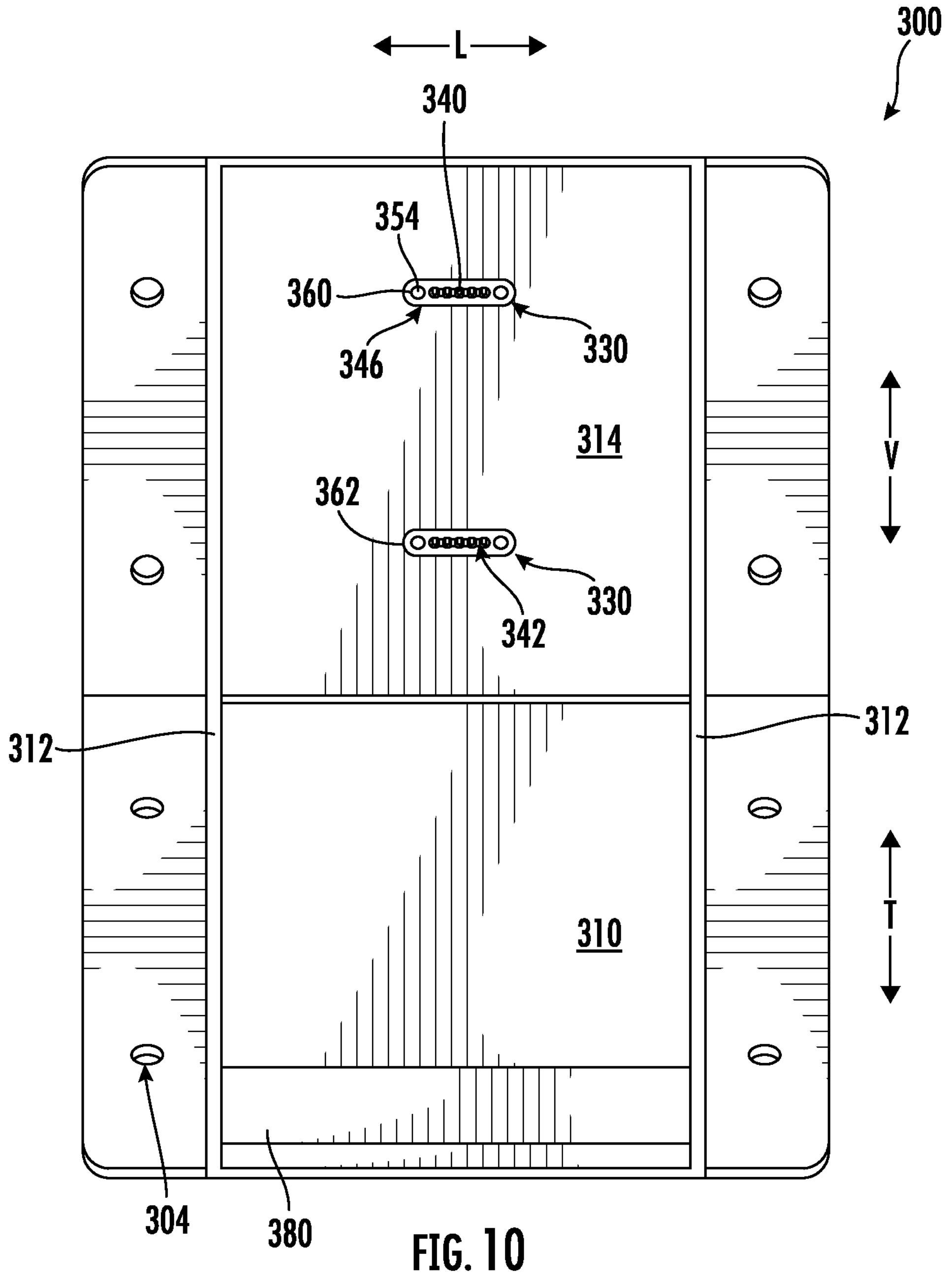
FIG. 10 is a perspective view of the exemplary container docking station of FIG. 8 according to an example embodiment of the present subject matter.
Figure 11:
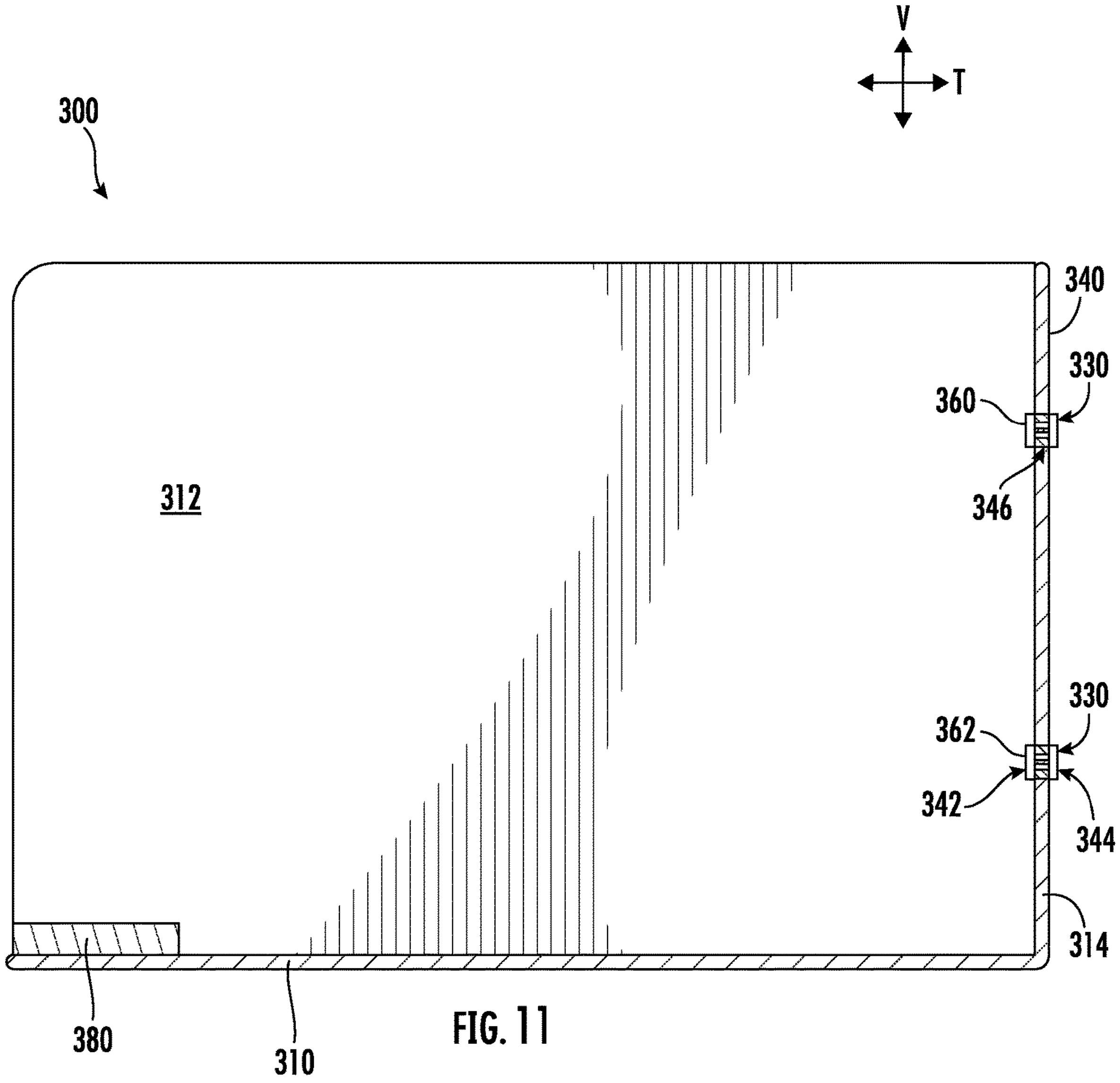
FIG. 11 is side, cross sectional of the exemplary container docking station of FIG. 8 according to an example embodiment of the present subject matter.
Figure 12:
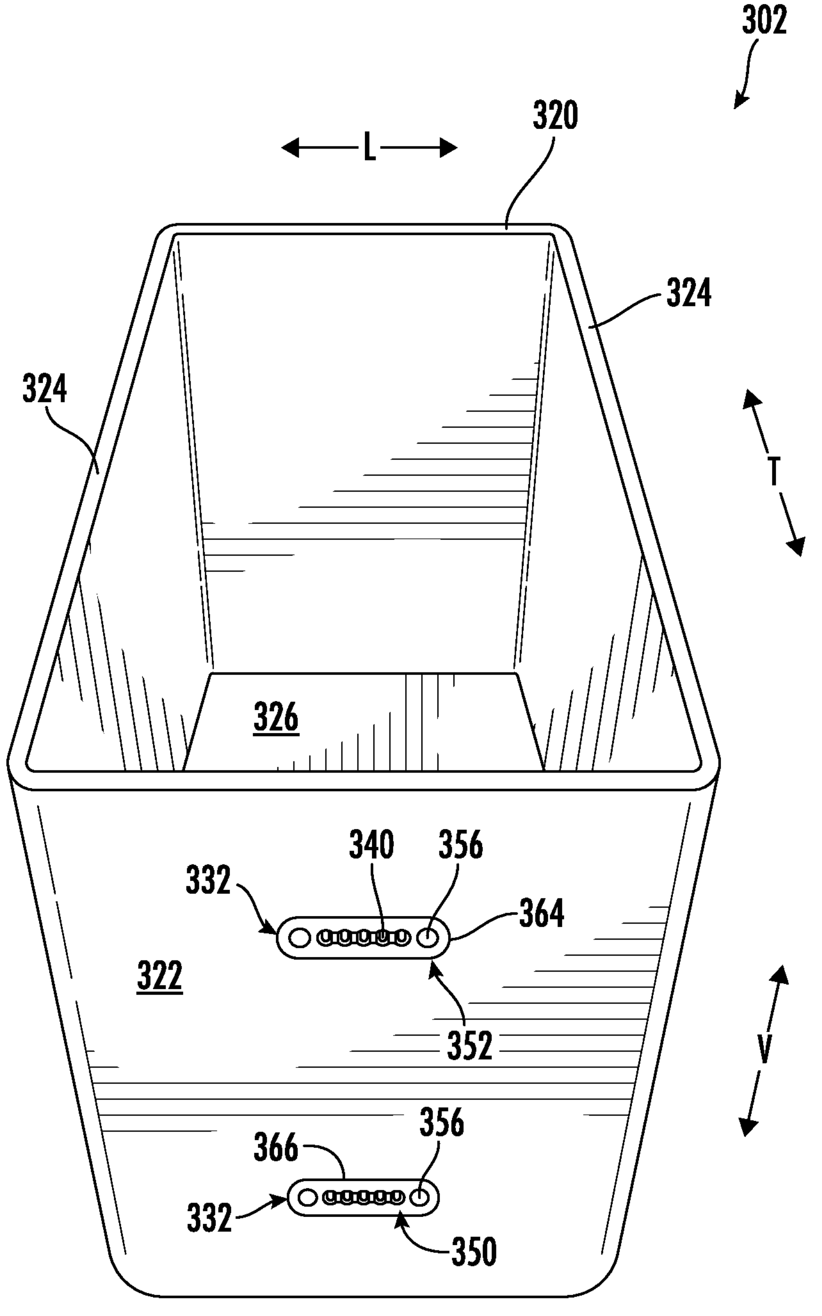
FIG. 12 is a rear, perspective view of the exemplary container docking station of FIG. 8 according to an example embodiment of the present subject matter.

Referring now specifically to FIGS. 8, 10, and 11, container docking station 300 may further include features for ensuring that water container 302 is fully inserted into container docking station 300 along the transverse direction T. In this regard, for example, container docking station 300 may define a raised front lip 380 that is configured to engage water container 302 as it slides into the installed position. For example, the bottom of water container 302 may define complementary features to raised front lip 380 such that the two complementary features engage each other only when water container 302 is in the properly installed position. According to still other embodiments, raised front lip 380 may be tapered such that is thinner toward the front of container docking station 300. In this manner, sliding water container 302 into container docking station 300 along the transverse direction T causes water container 302 to ride along the raised front lip 380 until it falls off of the back side of raised front lip 380 to lock water container 302 in place. Alternatively, water container 302 may be designed to sit on raised front lip 380 in the installed position to support only the front of water container 302 and provide leverage for increased pressure against docking connectors 330.

As explained herein, aspects of the present subject matter are generally directed to an indoor smoker including a detectable water tray with magnetic connectors, to secure the tray to the base station. In addition to the mechanical connection, the connectors may include electrical pins-plate pair which connects when magnetic connectors are in proximity and the magnetic attraction forces the pieces to come together, creating an electrical connection with each corresponding in.

The exemplary water tray described herein may be utilized to extinguish the smoldering charcoal pellets quickly. In this regard, once the smoking operation is completed, hot pellets are shifted and dumped into the water tray. The electrical configuration using detachable connectors provides a path for acquiring the water level data for the microcontroller. In this manner, the tray allows the user to know when there is a presence of water in the tray at a certain height using an electrical connection while also letting the user know if there is too much water at a certain height using an electrical connection.

During operation, the microcontroller may detect the continuity between the pins of the magnetic connector, and if continuity is detected, the water level is more or equal to the level of the magnetic connectors. By contrast, if the measured conductivity is zero, the water is lower than the vertical position of the magnetic connectors. Securing the tray magnetically to the smoker base station also provides a sense of security to the user and provides an advantageous solution to detect the water level in the smoker waste tray.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker defining a vertical direction, a lateral direction, and a transverse direction, the indoor smoker comprising:

a cabinet;

a smoking chamber positioned within the cabinet;

a smoke generating assembly configured for selectively smoldering combustible material to create a flow of smoke, wherein the combustible material is discharged through a discharge port; and a water extinguishing assembly comprising:

a container docking station positioned below the discharge port, the container docking station comprising a first docking connector and a second docking connector mounted to the container docking station; and a water container configured for receipt within the container docking station, the water container comprising:

a first container connector configured for electrically connecting to the first docking connector when the water container is in an installed position, wherein the first docking connector and the first container connector are mounted at a first height along a vertical direction; and a second container connector mounted to the water container, wherein the second docking connector and the second container connector are mounted at a second height along the vertical direction.

2. The indoor smoker of claim 1, wherein the first container connector comprises a first contact and a second contact that extend from an interior reservoir of the water container to an outer wall of the water container.

3. The indoor smoker of claim 2, wherein the first contact and the second contact are configured to close a circuit when water in the water container is at or above the first contact and the second contact.

4. The indoor smoker of claim 2, wherein the first docking connector comprises a first contact that is electrically connected to the first contact of the first container connector and a second contact that is electrically connected to the second contact of the first container connector when the water container is in the installed position.

5. The indoor smoker of claim 1, wherein the container docking station further comprises a docking magnet and the water container further comprises a container magnet, and wherein a magnetic force between the docking magnet and the container magnet secures the water container in the container docking station in the installed position.

6. The indoor smoker of claim 5, wherein the docking magnet and the first docking connector form a single unit mounted in a rear wall of the container docking station and the container magnet and the first container connector form a single unit mounted in a rear wall of the water container.

7. The indoor smoker of claim 1, further comprising a controller electrically coupled to the first docking connector, the controller being configured to:

detect electrical discontinuity at the first docking connector and provide a user notification that the water container needs to be refilled or properly installed.

8. The indoor smoker of claim 1, wherein the first height is associated with a maximum water level and the second height is associated with a minimum water level.

9. The indoor smoker of claim 1, further comprising a controller electrically coupled to the first docking connector and the second docking connector, the controller being configured to:

detect electrical continuity at the first docking connector and provide a user notification that a water level is high; and detect electrical discontinuity at the second docking connector and provide a user notification that the water level is low.

10. The indoor smoker of claim 9, wherein the controller is in operative communication with a user interface panel of the indoor smoker, wherein the user notification that the water level is high and the user notification that the water level is low are provided through the user interface panel.

11. The indoor smoker of claim 1, wherein the smoke generating assembly comprises:

a smoke barrel defining a smoldering chamber that extends between a first end and a second end along a central axis, the smoke barrel being configured for receiving the combustible material;

an auger positioned within the smoke barrel and being rotatable about the central axis for selectively urging the combustible material from the first end toward the second end of the smoldering chamber; and a smoldering heater in thermal communication with the smoke barrel for smoldering the combustible material as the auger advances the combustible material past the smoldering heater.

12. The indoor smoker of claim 11, wherein the discharge port is positioned proximate the second end of the smoke barrel and within or over the water container when the water container is in the installed position.

13. A water extinguishing assembly for an indoor smoker, the indoor smoker comprising a smoking chamber positioned within a cabinet and a smoke generating assembly configured for selectively smoldering combustible material to create a flow of smoke, wherein the combustible material is discharged through a discharge port, the water extinguishing assembly comprising:

a container docking station positioned below the discharge port, the container docking station comprising a first docking connector and a second docking connector mounted to the container docking station; and a water container configured for receipt within the container docking station, the water container comprising:

a first container connector configured for electrically connecting to the first docking connector when the water container is in an installed position, wherein the first docking connector and the first container connector are mounted at a first height along a vertical direction; and a second container connector mounted to the water container, wherein the second docking connector and the second container connector are mounted at a second height along the vertical direction.

14. The water extinguishing assembly of claim 13, wherein the first container connector comprises a first contact and a second contact that extend from an interior reservoir of the water container to an outer wall of the water container.

15. The water extinguishing assembly of claim 13, wherein the container docking station further comprises a docking magnet and the water container further comprises a container magnet, and wherein a magnetic force between the docking magnet and the container magnet secures the water container in the container docking station in the installed position.

16. The water extinguishing assembly of claim 13, wherein the first height is associated with a maximum water level and the second height is associated with a minimum water level.

17. The water extinguishing assembly of claim 13, further comprising a controller electrically coupled to the first docking connector and the second docking connector, the controller being configured to:

detect electrical continuity at the first docking connector and provide a user notification that a water level is high; and detect electrical discontinuity at the second docking connector and provide a user notification that the water level is low.

18. The water extinguishing assembly of claim 13, wherein a controller is in operative communication with a user interface panel of the indoor smoker, wherein a user notification that a water level is high and a user notification that a water level is low are provided through the user interface panel.

* * * * *